(12) United States Patent
Alon

(10) Patent No.: US 9,696,965 B2
(45) Date of Patent: Jul. 4, 2017

(54) INPUT-DEPENDENT RANDOM NUMBER GENERATION USING MEMORY ARRAYS

(71) Applicant: Nuvoton Technology Corporation, Hsin-chu (TW)

(72) Inventor: Moshe Alon, Tel Aviv (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 77 days.

(21) Appl. No.: 14/938,861

(22) Filed: Nov. 12, 2015

(65) Prior Publication Data
US 2016/0170711 A1 Jun. 16, 2016

Related U.S. Application Data

(60) Provisional application No. 62/092,281, filed on Dec. 16, 2014.

(51) Int. Cl.
G06F 7/58 (2006.01)

(52) U.S. Cl.
CPC .............. *G06F 7/582* (2013.01); *G06F 7/588* (2013.01)

(58) Field of Classification Search
CPC ............. G06F 7/58; G06F 7/782; G06F 7/584
See application file for complete search history.

(56) References Cited

U.S. PATENT DOCUMENTS

| 4,161,041 | A | * | 7/1979 | Butler | ............... G06F 7/58 365/244 |
| 5,251,165 | A | * | 10/1993 | James, III | ............... G06F 7/582 708/250 |
| 6,763,363 | B1 | | 7/2004 | Driscoll | |
| 2005/0097153 | A1 | | 5/2005 | Dirscherl et al. | |
| 2014/0344321 | A1 | * | 11/2014 | Hamilton | ............... G06F 7/588 708/255 |
| 2015/0149790 | A1 | * | 5/2015 | Li | ............... G06F 7/584 713/193 |

FOREIGN PATENT DOCUMENTS

DE 19921852 A1 11/2000
JP 2567681 B2 12/1996

* cited by examiner

*Primary Examiner* — Chuong D Ngo
(74) *Attorney, Agent, or Firm* — D.Kligler IP Services Ltd.

(57) ABSTRACT

An apparatus includes input circuitry that splits an input value into first bit-groups. First memory arrays are each populated with first random numbers, receive from the input circuitry a first bit-group, and retrieve and output a first random number from a first address indicated by the received first bit-group. Distribution circuitry splits each first random number output by the first memory arrays into second bit-groups, and distributes the second bit-groups. Second memory arrays are each populated with second random numbers, receive via the distribution circuitry a second bit-group from each first memory array, concatenate the received second bit-groups so as to form an address indicator, and retrieve and output a second random number from a second address indicated by the address indicator. Output circuitry combines the second random numbers output by the second memory arrays into an output random number that depends on the input value.

12 Claims, 2 Drawing Sheets

US 9,696,965 B2

INPUT-DEPENDENT RANDOM NUMBER GENERATION USING MEMORY ARRAYS

CROSS-REFERENCE TO RELATED APPLICATIONS

This application claims the benefit of U.S. Provisional Patent Application 62/092,281, filed Dec. 16, 2014, whose disclosure is incorporated herein by reference.

FIELD OF THE INVENTION

The present invention relates generally to random number generations, and particularly to methods and systems for generating random numbers using memory arrays.

BACKGROUND OF THE INVENTION

Random number generation is used in a wide variety of applications. Various techniques for random number generation are known in the art. For example, U.S. Patent Application Publication 2005/0097153, whose disclosure is incorporated herein by reference, describes a pseudorandom number generator that includes a first elemental shift register having a non-linear feedback feature, a second elemental shift register and combiner for combining signals at an output of the first elemental shift register and the second elemental shift register to obtain a combined signal representing a pseudorandom number.

U.S. Pat. No. 6,763,363, whose disclosure is incorporated herein by reference, describes a pseudorandom number generator that includes a linear feedback shift register (LFSR) having a state contained in N storage elements storing N bits of binary data which are separated into w words having word length M. At least two tap sources provide binary data, each tap source having a number of bits that is a multiple of M. The LFSR also includes a linear feedback function coupled to tap sources and providing a temporary value that is a linear function, such as bit-wise exclusive-or, of the binary data provided from the tap sources. The LFSR state is advanced by shifting the binary data in the storage elements by a multiple of M bits and provide the temporary value to fill in storage elements that would otherwise be empty from the shifting.

Additional random number generation schemes are described in Japanese Patent JP2567681B2, and in German Patent Application DE19921852A1, whose disclosures are incorporated herein by reference.

SUMMARY OF THE INVENTION

An embodiment of the present invention that is described herein provides an apparatus including input circuitry, multiple first memory arrays, distribution circuitry, multiple second memory arrays, and output circuitry. The input circuitry is configured to split an input value into multiple first bit-groups. The multiple first memory arrays are each configured to be populated with first random numbers, to receive from the input circuitry a respective first bit-group, and to retrieve and output a first random number from a first address indicated by the received first bit-group. The distribution circuitry is configured to split each first random number that is output by the first memory arrays into multiple second bit-groups, and to distribute the second bit-groups. The multiple second memory arrays are each configured to be populated with second random numbers, to receive via the distribution circuitry a respective second bit-group from each first memory array, to concatenate the received second bit-groups so as to form an address indicator, and to retrieve and output a second random number from a second address indicated by the address indicator. The output circuitry is configured to combine respective second random numbers output by the second memory arrays into an output random number that depends on the input value.

In some embodiments, the output circuitry is configured to combine the second random numbers by applying to the second random numbers a reversible transformation. The reversible transformation may include one or more of a bit-wise XOR operation and a finite-field multiplication. In an embodiment, the first random numbers in each of the first memory arrays cover an entire range of numbers with no repetitions and in a random order. In a disclosed embodiment, the apparatus further includes ciphering circuitry, which is configured to encrypt or decrypt a data word by applying to the data word a reversible transformation using the output random number. In an example embodiment the input value is indicative of a memory address in which the data word is stored.

There is additionally provided, in accordance with an embodiment of the present invention, a method including splitting an input value into multiple first bit-groups. In each of multiple first memory arrays that are each populated with first random numbers, a respective first bit-group of the input value is received, and a first random number is retrieved and output from a first address indicated by the received first bit-group. Each first random number that is output by the first memory arrays is split into multiple second bit-groups. In each of multiple second memory arrays that are each populated with second random numbers, a respective second bit-group is received from each first memory array, the received second bit-groups are concatenated so as to form an address indicator, and a second random number is retrieved and output from a second address indicated by the address indicator. Respective second random numbers output by the second memory arrays are combined into an output random number that depends on the input value.

There is further provided, in accordance with an embodiment of the present invention, an apparatus including input circuitry, multiple first deterministic Random Number Generation (RNG) modules, distribution circuitry, multiple second deterministic RNG modules, and output circuitry. The input circuitry is configured to split an input value into multiple first bit-groups. The multiple first deterministic RNG modules are each configured to receive from the input circuitry a respective first bit-group, and to generate and output a first deterministic random number depending on the received first bit-group. The distribution circuitry is configured to split each first deterministic random number that is output by the first deterministic RNG modules into multiple second bit-groups, and to distribute the second bit-groups. The multiple second deterministic RNG modules are each configured to receive via the distribution circuitry a respective second bit-group from each first deterministic RNG module, to concatenate the received second bit-groups so as to form an indicator, and to generate a second deterministic random number depending on the indicator. The output circuitry is configured to combine respective second deterministic random numbers output by the second deterministic RNG modules into a deterministic output random number that depends on the input value.

In an embodiment, at least one of the first or second deterministic RNG modules includes a memory array that is populated with random numbers. In an embodiment, at least one of the first or second deterministic RNG modules includes a finite-field multiplier.

The present invention will be more fully understood from the following detailed description of the embodiments thereof, taken together with the drawings in which:

DETAILED DESCRIPTION OF EMBODIMENTS

Overview

Figure 1A:
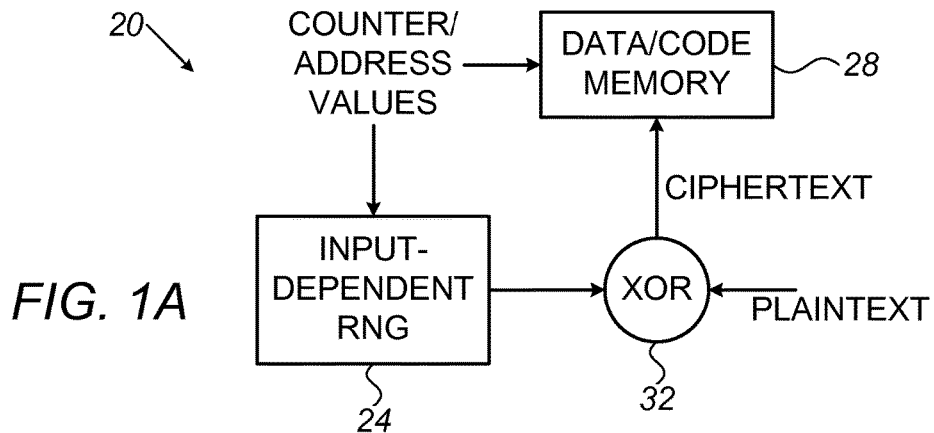
FIGS. 1A and 1B are block diagrams that schematically illustrate a secure memory system, in accordance with an embodiment of the present invention.

Embodiments of the present invention that are described herein provide improved methods and devices for random number generation. In the disclosed embodiments, a Random Number Generator (RNG) generates random numbers in response to respective input values. The random numbers depend deterministically on the respective input values. At the same time, however, the random numbers have random statistical characteristics, and the input values cannot be deduced or reverse-engineered from the output random numbers. Such a scheme is referred to herein as "input-dependent random number generation," and is suitable, for example, for stream encryption and decryption of data or code stored in secure memory.

In some embodiments, the RNG comprises two groups of memory arrays. The first group has a total of n memory arrays, and the second group has a total of l memory arrays. Each of the memory arrays in the two groups is populated a-priori with random numbers.

In order to generate a random number from a given input value, the input value is split into n groups of bits (denoted bit-groups). Each of the bit-groups is provided as an address indicator to a respective memory array of the first group. Each of the memory arrays of the first group retrieves a respective random number from the address indicated by the address indicator it received.

Each random number, which was retrieved and output by a respective memory array of the first group, is now split into l groups of bits (bit-groups), and each of these bit-groups is sent to a respective memory array of the second group. Thus, each memory array of the second group receives n groups of bits, one from each memory array of the first group. Each memory array of the second group concatenates the n groups of bits it receives from the n memory arrays of the first group, so as to form an address indicator, and retrieves the random number from the address indicated by this address indicator.

The l random numbers provided by the l memory arrays of the second group are combined, e.g., using bit-wise XOR or finite-field multiplication, to produce an output random number that depends deterministically on the given input value.

The disclosed RNG configurations are simple to implement, and have small latency and low power consumption. Moreover, by breaking the random number generation scheme into multiple small memory arrays in the manner described herein, the disclosed techniques require far less memory space than a comparable solution that uses a single memory array.

The resulting random numbers have highly random statistics. Furthermore, when the disclosed RNG generates a sequence of random numbers from a sequence of successive input values, the random numbers in the sequence are uncorrelated.

It is possible in principle to carry out input-dependent random number generation using other means, e.g., using SHA1, SHA2 or AES hashing functions. Such solutions, however, use smaller seeds relative to the disclosed techniques, and involve more complex computations that increase latency and power consumption.

In some embodiments, the RNG configurations described herein are used for stream encryption or decryption, in which case the input values comprise incrementing counter values or memory addresses. The disclosed RNG may be implemented, for example, as part of an interface of a memory system that stores data and/or program code securely.

Example System Description

Figure 1B:
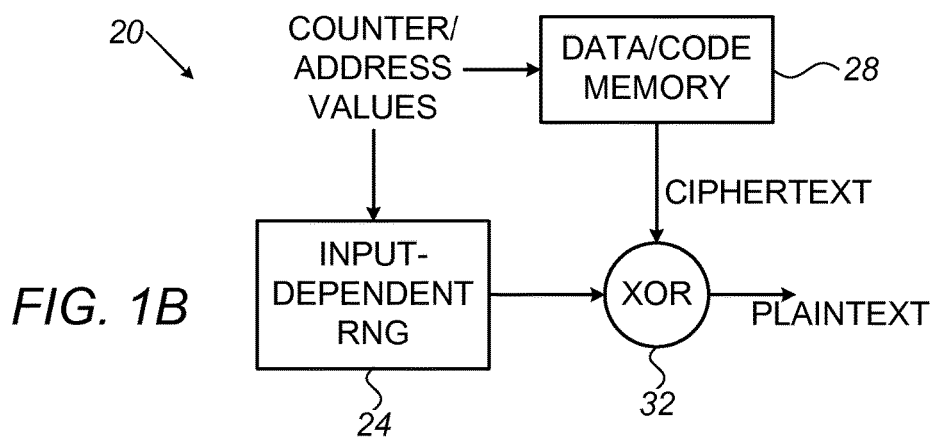

FIGS. 1A and 1B are block diagrams that schematically illustrate a secure memory system 20, in accordance with an embodiment of the present invention. System 20 comprises a memory 28, e.g., a Random Access Memory (RAM) or Flash memory, which is used for storage of data. In the present context, the term "data" refers to user data, program code or other suitable information.

As part of the security measures in system 20, the data is stored in memory 28 in encrypted form, and decrypted upon retrieval from memory 28. Encryption and decryption are performed using random numbers that are generated by a Random Number Generator (RNG) 24.

FIG. 1A illustrates the process of encrypting data and storing it in memory 28. In the present example, each data word is stored in a respective address in memory 28. The addresses are also used as input values for generating random numbers for encrypting the data words prior to storage.

Typically, for each data word to be stored in memory 28, address generation circuitry in system 20 (not shown) generates a respective address value. In addition to serving as an address for storage in memory 28, the same address value is also used as an input value to RNG 24. RNG 24 generates a random number depending on the address value. System 20 encrypts the data word (referred to as PLAINTEXT in the figure) by calculating a bitwise XOR function between the data word and the deterministic random number, using a XOR unit 32. The encrypted data word (referred to as CIPHERTEXT in the figure) is then stored in the corresponding address in memory 28.

The cryptographic quality of the above encryption process stems from the fact that XOR is a reversible transformation. In a reversible transformation, when the inputs are symmetric (i.e., the transformation output does not change if the inputs are switched with one another), there is no correlation between the transformation output and the data at one input if the data at the other input is random. Another example of a reversible transformation is finite-field multiplication, e.g., multiplication over some Galois Field (GF). Thus, in alternative embodiments, XOR unit 32 may be replaced with a finite-field (e.g., GF) multiplier, or with any other ciphering circuitry that performs any other suitable reversible transformation.

FIG. 1B illustrates the process of decrypting data that is retrieved from memory 28. When retrieving an encrypted data word from a certain address, the address generation circuitry generates the appropriate address value. The address value is provided to memory 28 for retrieving the encrypted data word, and also to RNG 24. RNG 24 generates a deterministic random number depending on the address value. The encrypted data word is decrypted by applying the bit-wise XOR between the encrypted data word and the output of the Input Dependent RNG 24.

In embodiments in which XOR unit 32 is replaced with a finite-field multiplier, an additional reciprocation operation of the finite field (conversion of A into $A^{-1}$) should be implemented between the output of RNG 24 and the multiplier. Reciprocation should be applied to the RNG output either only during encryption, or only during decryption (but not during both).

The reciprocation operation may be implemented in any suitable way, for example using a look-up table or suitable logic circuitry. In some embodiments, the finite-field multiplier may be implemented using two or more multipliers having smaller word-widths. In these embodiments, the reciprocation operation may also be split into two or more reciprocation operations having smaller word-widths, preceding the multipliers. A solution of this sort is advantageous, for example, since it requires a considerably smaller overall memory size for the look-up tables.

In order for the encryption and decryption processes to function correctly, the random number used for encrypting a given data word should be the same random number that will later be used for decrypting it. In other words, the random numbers generated by RNG 24 should depend deterministically on the respective input values. At the same time, it should be impossible, or at least infeasible, to derive the input values from the random numbers. This relationship between the input values and the corresponding random numbers is referred to herein as "input-dependent random number generation."

The description that follows provides example schemes for implementing an input-dependent RNG. These schemes may be used for implementing RNG 24 of system 20. Alternatively, the disclosed RNG configurations can be used in any other suitable host system or application that involve generation of deterministic random numbers.

Input-Dependent Random Number Generators Using Memory Arrays

Figure 2:
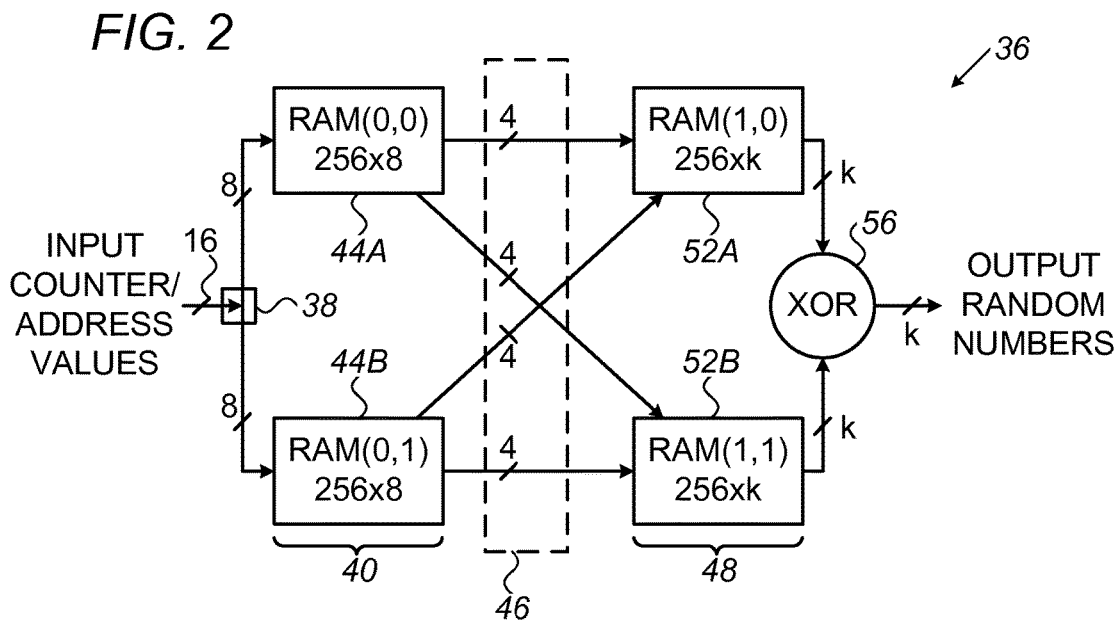
FIGS. 2 and 3 are block diagrams that schematically illustrate input-dependent random number generators, in accordance with embodiments of the present invention.
Figure 3:
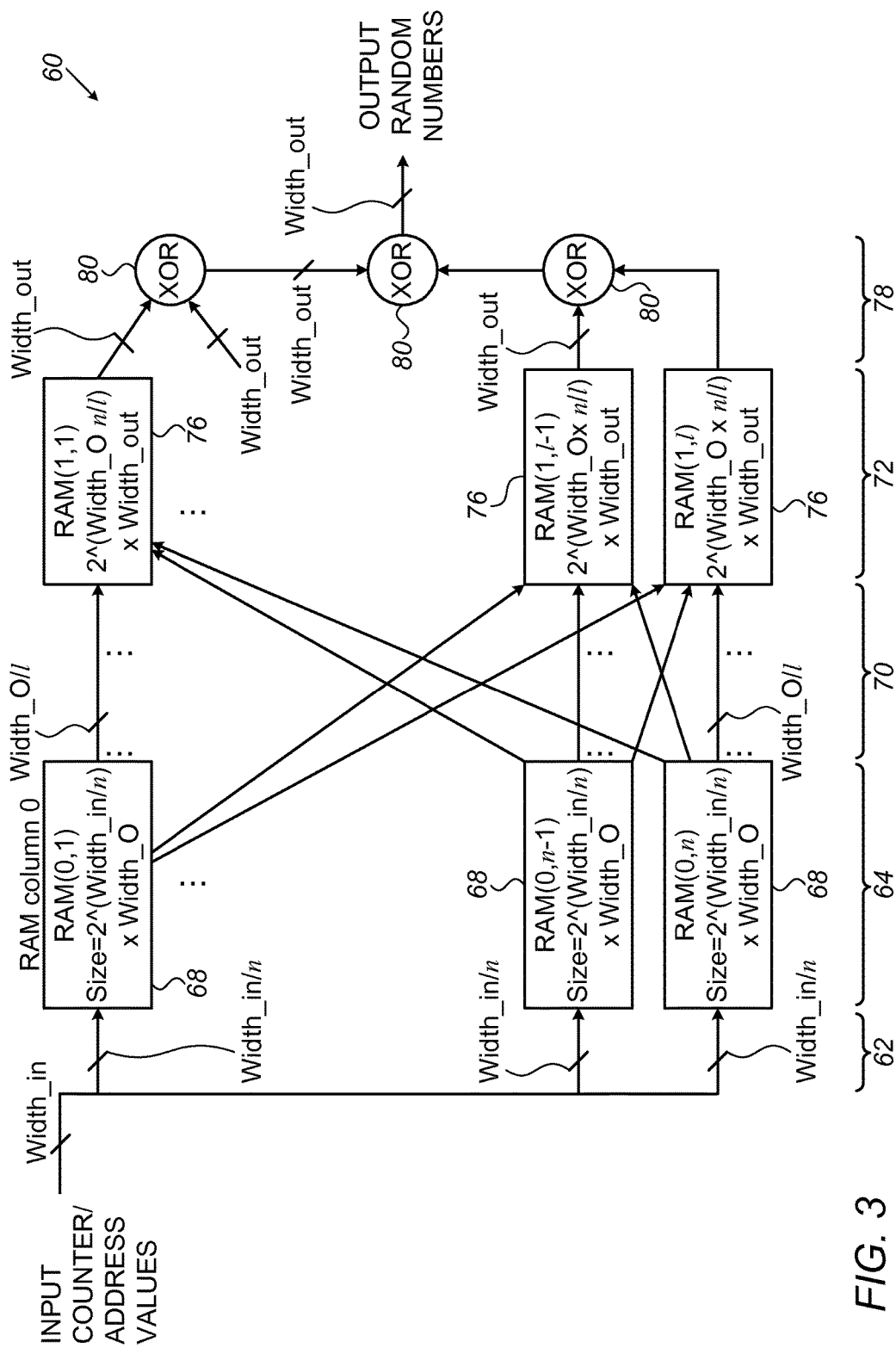

FIG. 2 is a block diagram that schematically illustrates an input-dependent RNG 36, in accordance with an embodiment of the present invention. The configuration of RNG 36 is a simplified configuration that is used for demonstrating the principles of the disclosed techniques. A more complex and generalized configuration is shown in FIG. 3 below.

RNG 36 of FIG. 2 comprises an input circuit 38, a first group 40 comprising two memory arrays 44A and 44B, a distribution circuit 46, a second group 48 comprising two memory arrays 52A and 52B, and an output circuit 56. In the present example, memory arrays 44A, 44B, 52A and 52B comprise parallel Random Access Memory (RAM) devices. Alternatively, however, any other suitable type of memory can be used, such as Flash memory, One-Time Programmable (OTP) memory or Read-Only Memory (ROM).

In the present example, memory arrays 44A and 44B each comprises a 256-by-8 memory, i.e., a memory that holds 256 bytes of data. Array 44A is also denoted RAM(0,0) and array 44B is also denoted RAM(0,1). Each of memory arrays 44A and 44B is populated a-priori, e.g., preloaded, with random numbers. Each of memory arrays 44A and 44B is populated with the complete range of binary values from zero (b00000000) to 255 (b11111111), with no missing values and no repetitions, in random order. (Repetitive values in any of memory arrays 44 would degrade the randomness of the output.)

Memory arrays 52A and 52B each comprises a 256-by-k memory, i.e., a memory that holds 256 k-bit data words. Array 52A is also denoted RAM(1,0) and array 52B is also denoted RAM(1,1). k denotes the word-width of the output random numbers. Each of memory arrays 52A and 52B is populated a-priori, e.g., preloaded, with random numbers. In the present example, each of memory arrays 52A and 52B is populated with 256 k-bit random numbers in random order.

Input circuit 38 receives input values, from which respective random numbers are to be generated deterministically. As noted above, the input values may comprise, for example, counter values or addresses. In the present example, each input value is a 16-bit binary number.

Input circuit 38 splits the input value into two 8-bit bit-groups, i.e., into two 8-bit binary numbers. Splitting can be performed, for example, by splitting the sixteen data lines of the input bus into two 8-line groups. One bit-group is provided to memory array 44A, and the other to memory array 44B.

Each of memory arrays 44A and 44B uses the received bit-group as an 8-bit address indicator. Each of memory arrays 44A and 44B retrieves the 8-bit random number stored in the address pointed-to by the bit-group it received, and outputs the random number to distribution circuit 46.

Distribution circuit 46 splits each 8-bit random number into two 4-bit bit-groups, and distributes the 4-bit bit-groups to respective memory arrays 52A and 52B of group 48. Thus, each of memory arrays 52A and 52B receives as input two 4-bit bit-groups, one from each of memory arrays 44A and 44B.

Each of memory arrays 52A and 52B concatenates the 4-bit bit-groups it received into an 8-bit word that is used as an address indicator. Each of memory arrays 52A and 52B retrieves the k-bit random number stored in the address pointed-to by this address indicator, and outputs the k-bit random number to output circuit 56.

Output circuit 56 combines the two k-bit random numbers it received into a single k-bit random number, and provides the resulting k-bit random number as output of the RNG. This scheme enables RNG 36 to generate up to $2^{16}$ k-bit output random numbers.

In the present example, output circuit 56 comprises an exclusive-OR (XOR) circuit that calculates a bit-wise XOR of its two k-bit inputs. Alternatively, output circuit 56 may comprise a finite-field multiplier, e.g., a $GF(2^k)$ multiplier. Further alternatively, output circuit 56 may comprise any other suitable circuit that performs any other suitable transformation, as long as the transformation is reversible as defined above. The transformation need not necessarily be symmetrical with respect to its inputs.

As can be seen from the configuration of RNG 36, the output random numbers depend deterministically on the respective input values. At the same time, the output random numbers are indeed random, and cannot be used to reproduce the original input values.

FIG. 3 is a block diagram that schematically illustrates an input-dependent RNG 60, in accordance with another embodiment of the present invention. The scheme of FIG. 3 generalizes the scheme of FIG. 2 to any desired number of memory arrays in each of the two groups.

RNG 60 comprises an input circuit 62, a first group 64 comprising n memory arrays 68 denoted RAM(0,1) . . . RAM(0,n), a distribution circuit 70, a second group 72 comprising 1 memory arrays 76 denoted RAM(1,1) . . . RAM(1,l), and an output circuit 78. As in the previous embodiment, the memory arrays in FIG. 3 comprise parallel RAM devices by way of example, but any other suitable type of memory (e.g., Flash, ROM or OTP) can also be used.

In the present example, the word-width (number of bits) of the input values is denoted Width_in. Memory arrays 68 each comprises a $2^{(Width\_in/n)}$-by-Width_O memory, i.e., a memory that holds $2^{(Width\_in/n)}$ words of data, each word having Width_O bits. Each of memory arrays 68 is populated a-priori, e.g., preloaded, with random numbers. Each memory array 68 is populated with $2^{(Width\_in/n)}$ random numbers. Each random number has Width_O bits, and the random numbers are stored in the memory arrays in random order and with minimal repetitions. If Width_O=Width_in/n or Width_O<Width_in/n, then the random numbers have no repetitions.

Memory arrays 76 of group 72 each comprises a $2^{((Width\_O)n/l)}$-by-Width_out memory, i.e., a memory that holds $2^{((Width\_O)n/l)}$ words of data, each word having Width_out bits. Width_out denotes the word-width (number of bits) of the output random numbers. Each of memory arrays 76 is populated a-priori, e.g., preloaded, with random numbers. Each memory array 76 is populated with $2^{((Width\_O)n/l)}$ random numbers. Each random number has Width_out bits, and the random numbers are stored in the memory arrays in random order and without repetitions.

Input circuit 62 receives input values, e.g., counter values or addresses. As noted above, each input value has Width_in bits. Input circuit 62 splits each input value into n bit-groups having Width_in/n bits each, e.g., by splitting the lines of the input bus into n groups. Each such bit-group is provided to a respective memory array 68 of group 64.

Each of memory arrays 68 uses the received bit-group as an address indicator. Each memory array 68 retrieves the random number stored in the address pointed-to by the bit-group it received, and outputs the random number to distribution circuit 70.

Distribution circuit 70 splits each random number into l bit-groups, each bit-group having Width_O/l bits. The distribution circuit distributes the bit-groups to respective memory arrays 76 of group 72. Thus, each of memory arrays 76 receives as input n bit-groups, one from each of memory arrays 68.

Each memory array 76 concatenates the n groups of bits it received into a single word (having a word size of Width_O×n/l) that is used as an address indicator. Each memory array 76 then retrieves the random number stored in the address pointed-to by this address indicator, and outputs the random number to output circuit 78. The word width of each such random number is Width_out.

Output circuit 78 combines the random numbers it receives into a single random number of Width_out bits, and provides the resulting random number as output of the RNG. This scheme enables RNG 36 to generate up to $2^{Width\_in}$ output random numbers with no repetitions.

In the present example, output circuit 78 comprises multiple XOR circuits 80 arranged in a tree configuration. In the tree configuration, pairs of random numbers produced by arrays 76 are combined by bit-wise XORs 80, pairs of combination results are combined again by bit-wise XORs 80, and so on, until producing a single random number of Width_out bits.

Alternatively, output circuit 78 may comprise multiple finite-field multipliers, e.g., GF multipliers. Further alternatively, output circuit 78 may comprise a combination of XOR circuits and GF multipliers. Generally, output circuit 78 may have any other suitable configuration, as long as the end-to-end transformation performed by circuit 78 as a whole is reversible, as defined above.

As can be appreciated from the configuration of RNG 60, the output random numbers depend deterministically on the respective input values. If Width_O is equal to Width_in/n, and l is a divisor of n (or the other way n is a divisor of l with Width_O/l≥1, then data repetition does not occur and the output random numbers cannot be used to reproduce the original input values. Otherwise, data repetition may occur, which may be problematic for large values of Width_out. If Width_out is considerably smaller than Width_in, data repetition is statistically rare, and a solution in which Width_O is smaller than width_in/n may provide sufficient input-dependent random data.

The system configuration of FIGS. 1A and 1B, and the RNG configurations of FIGS. 2 and 3, are example configurations that are shown purely for the sake of conceptual clarity. In alternative embodiments, any other suitable system and/or RNG configurations can be used. For example, the first and second groups of memory arrays may each have any desired number of memory arrays. The number of memory arrays is not necessarily the same in both groups.

In the examples above, each memory array is an independent standalone memory device, but this partitioning is not mandatory. In some embodiments, two or more of the memory arrays in the first and/or second group may be implemented in the same memory device using buffers. Such an implementation may incur additional latency, but this latency is tolerable in many practical implementations.

The specific word-widths used in the embodiment of FIG. 2 are chosen purely by way of example. In alternative embodiments, any other suitable word-widths can be used. Even more generally, in the configurations of FIGS. 2 and 3, different RAMs in a given group may operate with different word-widths. For example, the input circuit may divide the input value into bit-groups that do not all have the same number of bits, and thus different memory arrays in the first group may store random numbers having different word-widths. Similarly, the distribution circuit may divide the random numbers provided by the memory arrays in the first group into bit-groups that do not all have the same number of bits. Different memory arrays in the first group may also store random numbers having different word-widths.

In some embodiments, the number of memory arrays in the second group (l) may not be an integer divisor of the number of memory arrays in the first group (n). Additionally or alternatively, l and/or n may not be integer powers of 2.

In some embodiments, one or more of the memory arrays in the first or second group (e.g., one or more of arrays 44, 52, 68 or 76) can be replaced by a finite-field multiplier, such as a $GF(2^m)$ Galois-field multiplier. In such an implementation, one input of the multiplier is connected to the input of the array (a bit-group in the case of the first group of memory arrays, or a concatenated set of bit-groups in the case of the second group of memory arrays). The second input of the multiplier receives a constant value, i.e., a constant element of the finite field. Thus, in the present context, a finite-field multiplier or a memory array is referred to herein as an RNG module that is configured to generate and output a random number that depends on the value provided thereto as input.

The input-output functionality of such a multiplier-based RNG module is similar to that of a memory array of size $2^m$ that is populated randomly with the numbers 0 . . . $2^{m-1}$ without repetitions. The level of randomness of a multiplier-based solution, however, may be inferior to that of a memory-array-based solution.

The memory arrays of the first and/or second group may be preloaded with random numbers in any suitable way. In one embodiment, a digest function such as SHA1, SHA2 or AES may be applied repetitively to a random seed, so as to produce a series of random numbers for populating a memory array. This sort of random number generation is typically slow, and is therefore suitable for initialization or setup purposes that are not time sensitive. Such a random number generator can be used for setting the order in which numbers are loaded into the addresses of a memory array in the first group, or to directly load random numbers into the addresses of a memory array in the second group. During initialization, software code can be used in order to control the process of random number data generation and to control the storing and usage of the data in the different memory arrays.

Elements that are not necessary for understanding the principles of the present invention, such as various interfaces, control circuits, addressing circuits, timing and sequencing circuits and debugging circuits, have been omitted from the figure for clarity. The various system and RNG elements may be implemented in hardware, such as using one or more Field-Programmable Gate Arrays (FPGAs) and/or Application-Specific Integrated Circuits (ASICs), in software, or using a combination of hardware or software elements.

In some embodiments, some system or RNG elements may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Although the embodiments described herein mainly address random number generation for secure data storage, the methods and systems described herein can also be used in other applications, such as in Elliptic Curve Cryptography (ECC) or RSA key generation, or in random-stream generation used for challenge-response in various security schemes.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
input circuitry, configured to split an input value into multiple first bit-groups;
multiple first memory arrays, which are each configured to be populated with first random numbers, to receive from the input circuitry a respective first bit-group, and to retrieve and output a first random number from a first address indicated by the received first bit-group;
distribution circuitry, configured to split each first random number that is output by the first memory arrays into multiple second bit-groups, and to distribute the second bit-groups;
multiple second memory arrays, which are each configured to be populated with second random numbers, to receive via the distribution circuitry a respective second bit-group from each first memory array, to concatenate the received second bit-groups so as to form an address indicator, and to retrieve and output a second random number from a second address indicated by the address indicator; and
output circuitry, configured to at least combine respective second random numbers output by the second memory arrays into an output random number that depends on the input value.

2. The apparatus according to claim 1, wherein the output circuitry is configured to combine the second random numbers by applying to the second random numbers a reversible transformation.

3. The apparatus according to claim 2, wherein the reversible transformation comprises one or more of a bit-wise XOR operation and a finite-field multiplication.

4. The apparatus according to claim 1, wherein, in each of the first memory arrays, the first random numbers cover an entire range of numbers with no repetitions and in a random order.

5. The apparatus according to claim 1, and comprising ciphering circuitry, configured to encrypt or decrypt a data word by applying to the data word a reversible transformation using the output random number.

6. The apparatus according to claim 5, wherein the input value is indicative of a memory address in which the data word is stored.

7. A method, comprising:
splitting an input value into multiple first bit-groups;
in each of multiple first memory arrays that are each populated with first random numbers, receiving a respective first bit-group of the input value, and retrieving and outputting a first random number from a first address indicated by the received first bit-group;
splitting each first random number that is output by the first memory arrays into multiple second bit-groups;
in each of multiple second memory arrays that are each populated with second random numbers, receiving a respective second bit-group from each first memory array, concatenating the received second bit-groups so as to form an address indicator, and retrieving and outputting a second random number from a second address indicated by the address indicator; and
combining respective second random numbers output by the second memory arrays into an output random number that depends on the input value.

8. The method according to claim 7, wherein combining the second random numbers comprises applying to the second random numbers a reversible transformation.

9. The method according to claim 8, wherein the reversible transformation comprises one or more of a bit-wise XOR operation and a finite-field multiplication.

10. The method according to claim 7, wherein, in each of the first memory arrays, the first random numbers cover an entire range of numbers with no repetitions and in a random order.

11. The method according to claim 7, and comprising encrypting or decrypting a data word by applying to the data word a reversible transformation using the output random number.

12. The method according to claim 11, wherein the input value is indicative of a memory address in which the data word is stored.

\* \* \* \* \*